(12) United States Patent
Genz et al.

(10) Patent No.: US 7,514,873 B2
(45) Date of Patent: Apr. 7, 2009

(54) ELECTRIC LAMP HAVING AN OUTER BULB

(75) Inventors: Andreas Genz, Berlin (DE); Leon Grabinski, Berlin (DE); Jürgen Gräf, Augsburg (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 358 days.

(21) Appl. No.: 11/414,388

(22) Filed: May 1, 2006

(65) Prior Publication Data

US 2006/0244384 A1 Nov. 2, 2006

(30) Foreign Application Priority Data

May 2, 2005 (DE) .................. 10 2005 020 344

(51) Int. Cl.
*H01J 61/30* (2006.01)
*H01J 17/16* (2006.01)
(52) U.S. Cl. .................. 313/634; 313/25; 313/567
(58) Field of Classification Search .................. None
See application file for complete search history.

(56) References Cited

U.S. PATENT DOCUMENTS

| 4,945,288 | A | * | 7/1990 | Morris et al. .................. 313/25 |
| 5,253,153 | A | | 10/1993 | Mathews et al. |
| 5,359,255 | A | * | 10/1994 | Kawai et al. .................. 313/17 |
| 6,239,539 | B1 | * | 5/2001 | Mochiduki et al. ...... 313/318.01 |
| 6,429,577 | B1 | * | 8/2002 | Kiryu et al. .................. 313/25 |
| 7,221,098 | B2 | * | 5/2007 | Graf et al. .................. 313/634 |
| 2004/0150344 | A1 | * | 8/2004 | Takagaki et al. ............ 313/634 |
| 2004/0253897 | A1 | | 12/2004 | Graf et al. |
| 2005/0174060 | A1 | * | 8/2005 | Hogele et al. ................ 313/635 |

FOREIGN PATENT DOCUMENTS

| CA | 2042143 | 12/1991 |
| EP | 1 492 146 | 6/1991 |
| EP | 465 083 | 9/1993 |
| EP | 588 602 | 5/2004 |

* cited by examiner

*Primary Examiner*—Ashok Patel

(57) ABSTRACT

The elongate bulb (1) of the lamp, which defines a longitudinal axis (A), is sealed at mutually opposing ends by sealing parts (6; 32), to which an outer bulb is fixed, the ratio between the total length of the outer bulb LAKO and the inner length of the inner volume LEG being between 1.3 and 4, preferably 1.5 and 3.

9 Claims, 3 Drawing Sheets

ELECTRIC LAMP HAVING AN OUTER BULB

TECHNICAL FIELD

The invention relates to an electric lamp having an outer bulb having an elongate inner bulb, which is sealed in a vacuum-tight manner, defines a longitudinal axis and an inner length LEG, contains a luminous means and is sealed at two mutually opposing ends by sealing parts, an outer bulb having a total length LAKO and having two neck parts being turned over the inner bulb, and the neck parts being fixed to the sealing parts, the sealing parts containing foils. In this case, the electric lamp is in particular a metal halide lamp, a mercury high-pressure discharge lamp, or else a halogen incandescent lamp having an outer bulb. The inner bulb of the lamp is sealed at two ends by sealing parts. The outer bulb is fixed to one or both sealing parts.

BACKGROUND ART

CA2042143 and U.S. Pat. No. 5,253,153 have already disclosed an electric lamp having an outer bulb, this lamp having a burner which is surrounded by an outer bulb, which is fixed to the sealing part. In order to provide a better connection, in this case a radial bead is in particular provided on the sealing part, the end of the outer bulb resting on said radial bead and being fused to the bead there.

U.S.2004253897 has disclosed a lamp having an outer bulb but which cannot be used for compact luminaires. In such situations, the thermal load on the lamp is very high, with the result that special design measures need to be taken.

DISCLOSURE OF THE INVENTION

One object of the present invention is to provide a lamp having an outer bulb having an elongate inner bulb, which is sealed in a vacuum-tight manner, defines a longitudinal axis and an inner length LEG, contains a luminous means and is sealed at two mutually opposing ends by sealing parts, an outer bulb having a total length LAKO and having two neck parts being turned over the inner bulb, and the neck parts being fixed to the sealing parts, the sealing parts containing foils, which lamp can withstand a high thermal load and which ensures, in particular, a long life. Owing to a compact lamp shape, smaller and more cost-effective luminaires are possible.

This object is achieved by the following features:
the ratio between the total length of the outer bulb LAKO and the inner length of the inner volume LEG is between 1.3 and 4, preferably 1.5 and 3.

Particularly advantageous refinements are given in the dependent claims.

The lamp according to the invention has an inner bulb, in particular a discharge vessel, which is sealed in a vacuum-tight manner, defines a lamp axis and is sealed at mutually opposing ends by sealing parts. The sealing part is a pinch seal or else a fuse seal. The luminous means in the interior of the lamp is a discharge arc between two electrodes or a luminous element. It is electrically conductively connected to the inner power supply lines leading to it. The sealing part is in particular provided with an outwardly protruding extension, which is in the form of a hollow tube. The term discharge vessel will be used in the text which follows by way of example, without restriction, for the inner bulb.

Previous attempts for producing compact lamps of the generic type have only achieved a life of a maximum of 2000 hours, with the result that such lamps were only suitable for photo-optic applications.

According to the invention, particular attention is paid to the regulation of the temperature at the outer end of the molybdenum foil in the seal of the discharge vessel. Since the discharge vessel is not completely surrounded by an outer bulb, this point comes into contact with air. The molybdenum may oxidize, which interrupts the current flow. Therefore, a critical measure is now taken, namely shortening the outer bulb. The length of the outer bulb is understood to be its central part without any parts matched to the seal. In this case, it has proven critical that the length of the outer bulb defined in this manner, compared with the length of the discharge vessel, understood to be the length of its inner volume, is only between 1.3 and 4 times this length. In particular, a value of between 1.5 and 3 times is preferred, and a maximum value of 2.5 times is particularly preferred.

In this case, in particular the outer bulb is intended to bear as tightly as possible against the discharge vessel. A favorable value for the ratio between the diameter of the outer bulb and the diameter of the discharge vessel is 1.1 to 2.5, and the ratio is preferably between 1.2 and 2.0.

A further important feature for orientation purposes is the length of the outer bulb (cylindrical part) in relation to the lamp power. This ratio LW should be between 1.8 and 3.5 W/mm. One specific example is a 75 W lamp having a length for the outer bulb of 36 mm, with the result that LW=75 W/36 mm=2.08 W/mm.

In the case of a 150 W lamp, a length for the outer bulb of 48 mm is used, with the result that in this case LW=150 W/48 mm=3.12 W/mm.

A further advantageous measure is the extension of the molybdenum foils. This should take place in relation to the length of the outer bulb. A high thermal load can be applied in particular if the total length of the two molybdenum foils of the discharge vessel LMO with respect to the length of the outer bulb LAKO is between 0.4 and 1, including boundary values, in particular at least 0.45. LMO/LAKO is preferably between 0.55 and 0.9. In this case, the two foils generally have the same length, but in specific cases it may be more favorable for one foil to be longer than the other. One specific exemplary embodiment is, for a 150 W lamp: 2×17 mm/48 mm=0.7; for a 70 W lamp: 2×12/36=0.66. In the case of a conventional lamp, this ratio is typically between 0.2 and 0.3.

A further advantageous measure is so-called drawing of the shafts, which surprisingly likewise assists in reducing the temperature at the end of the molybdenum foil. In the process, in the case of a fuse seal, this fuse seal is made thinner in the transition from the inner bulb to the shaft by means of drawing and becomes thicker again towards the shaft end. It preferably becomes thicker by 20 to 60%. Specifically at the thin point after the inner bulb, at a moderate power, typically 70 to 150 W, the shaft has a diameter of approximately 5 mm, and has a diameter of 7 to 8 mm at the point where the outer bulb is rolled on.

At least one sealing part is preferably provided with an in particular annular bead, which protrudes radially transversely with respect to the lamp axis. Such a design for the bead can be produced either after local heating by means of compression or by means of blowing. An even simpler measure is for a correspondingly shaped glass bead to be applied.

The outer bulb may be a continuous tube piece having a constant diameter, but may also be a bulb having a central bulge and tube pieces which adjoin said central bulge at the ends and are, in particular, attached or integrally formed.

One preferred embodiment provides for a tubular extension piece of the sealing part which is adjoined by the bead. In particular, it is placed on or integrally formed. As a result, it is possible to provide a radially symmetrical bead even in the case of a pinch seal which is not radially symmetrical. In the case of a fuse seal, such an extension piece is not absolutely necessary. Both the inner bulb and the outer bulb are preferably made from quartz glass, possibly even from hard glass.

BRIEF DESCRIPTION OF THE DRAWINGS

The invention will be explained in more detail below with reference to a plurality of exemplary embodiments. In the drawings.

BEST MODE FOR CARRYING OUT THE INVENTION

Figure 1:
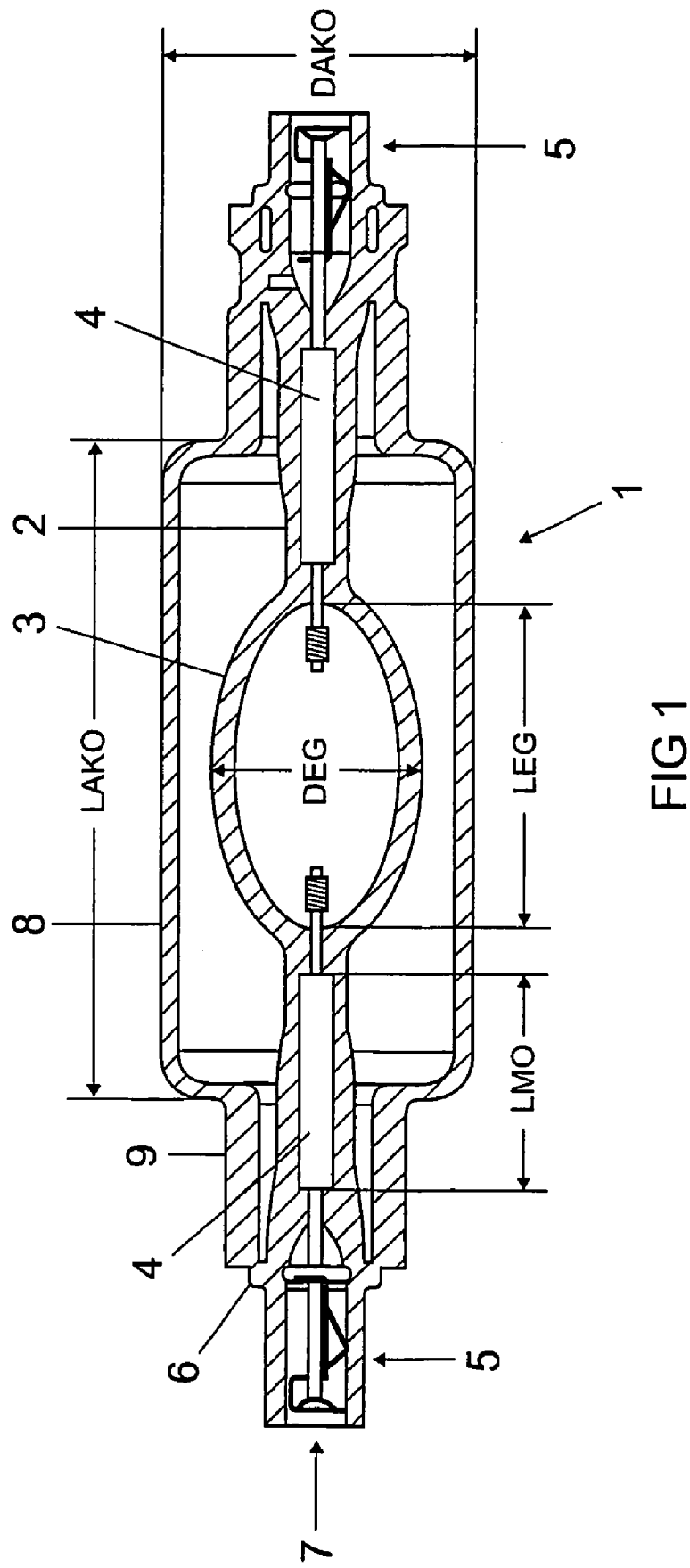
FIG. 1 shows a side view of an exemplary embodiment of a metal halide lamp.

FIG. 1 shows a metal halide lamp 1, which is sealed by fuse seals 2. The lamp is a 150 W lamp having a discharge vessel 3.

At the start, the fuse seals have a diameter of 5 mm, which widens to 7.3 mm at the level of the fuse-seal foils 4 made from molybdenum. The foils are in each case 17 mm long, i.e. LMO=34 mm. At the end of the fuse seal, a short tube piece 5 is attached integrally, which is equipped with a bead 6. A base part 7 is integrated in the tube piece.

The discharge vessel is surrounded by an outer bulb 8, which is essentially cylindrical. It tapers at the level of the foil to form a neck part 9, which ends at the bead 6. The outer bulb has a length LAKO of 48 mm, and the total length including the two neck parts is 72 mm.

Despite the high load, such a compact lamp achieves a life of at least 6000 hours, in particular even more than 9000 hours given an optimum design.

Figure 2:
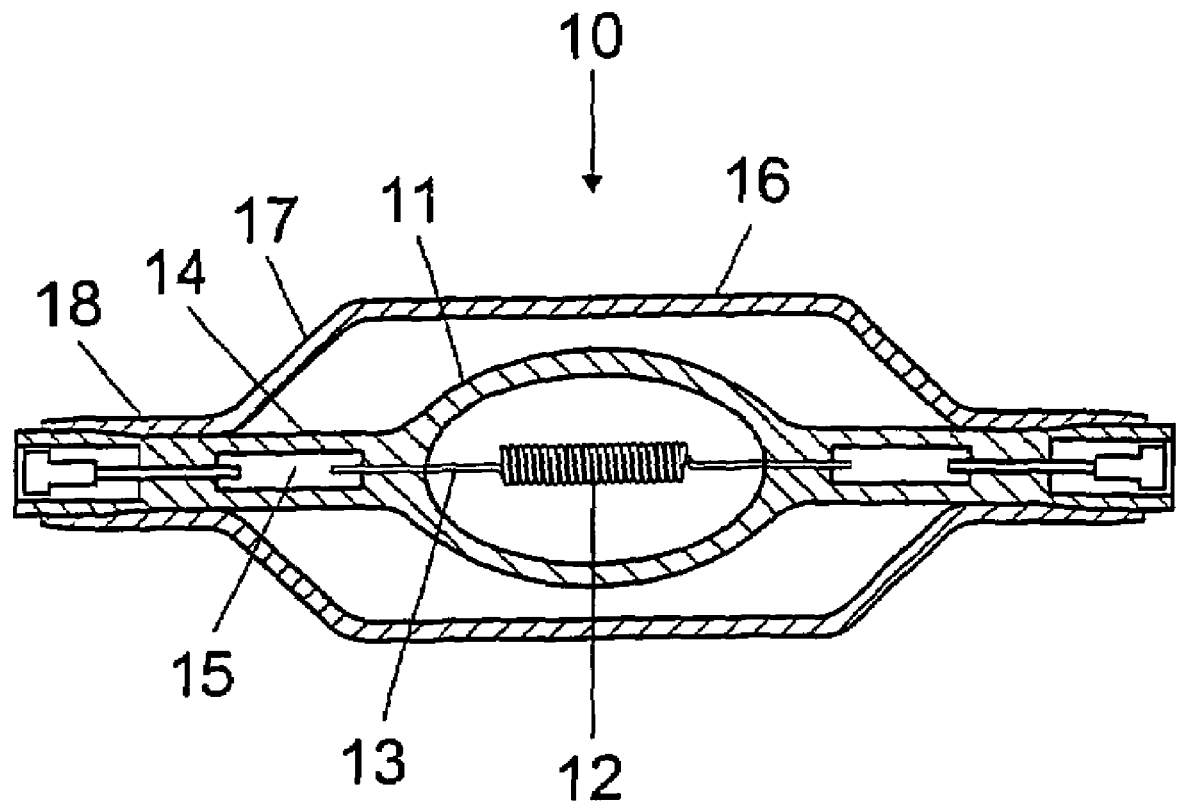
FIG. 2 shows a side view of a halogen incandescent lamp.

FIG. 2 shows the side view of a halogen incandescent lamp 10 having a pinch seal at two ends. It comprises an inner bulb 11 a luminous element 12 being arranged axially in the center of said inner bulb 11. The ends 13 of the luminous element, in their function as an inner power supply line, are embedded directly in the pinch seal 14 and are connected there to a pinch foil 15. The outer bulb 16 is cylindrical with beveled ends 17, which together define the length LAKO, in this case, and with a neck part 18, which bears against the pinch seal 14.

Specific dimensions are given in the table below for metal halide lamps having powers of 70 and 150 W. They may also be used for halogen incandescent lamps as a starting point for the dimensions. In this case, the dimensions of the metal halide lamps can be used independently of the luminous color, for example for warm white and neutral white.

TABLE 1

| Power | 75 W | 150 W |
| --- | --- | --- |
| Average life (h) | 9000 | 9000 |
| Distance between electrodes (mm) | 9 | 15 |

TABLE 1-continued

| Diameter of inner bulb (in mm) | 11 | 14.9 |
| --- | --- | --- |
| Length of inner bulb (in mm) | 16.7 | 24.7 |
| Diameter of outer bulb (in mm) | 18.8 | 22.3 |
| Length LAKO of outer bulb (in mm) | 36 | 48 |
| Total lamp length (in mm) | 77 | 95 |

Figure 3:
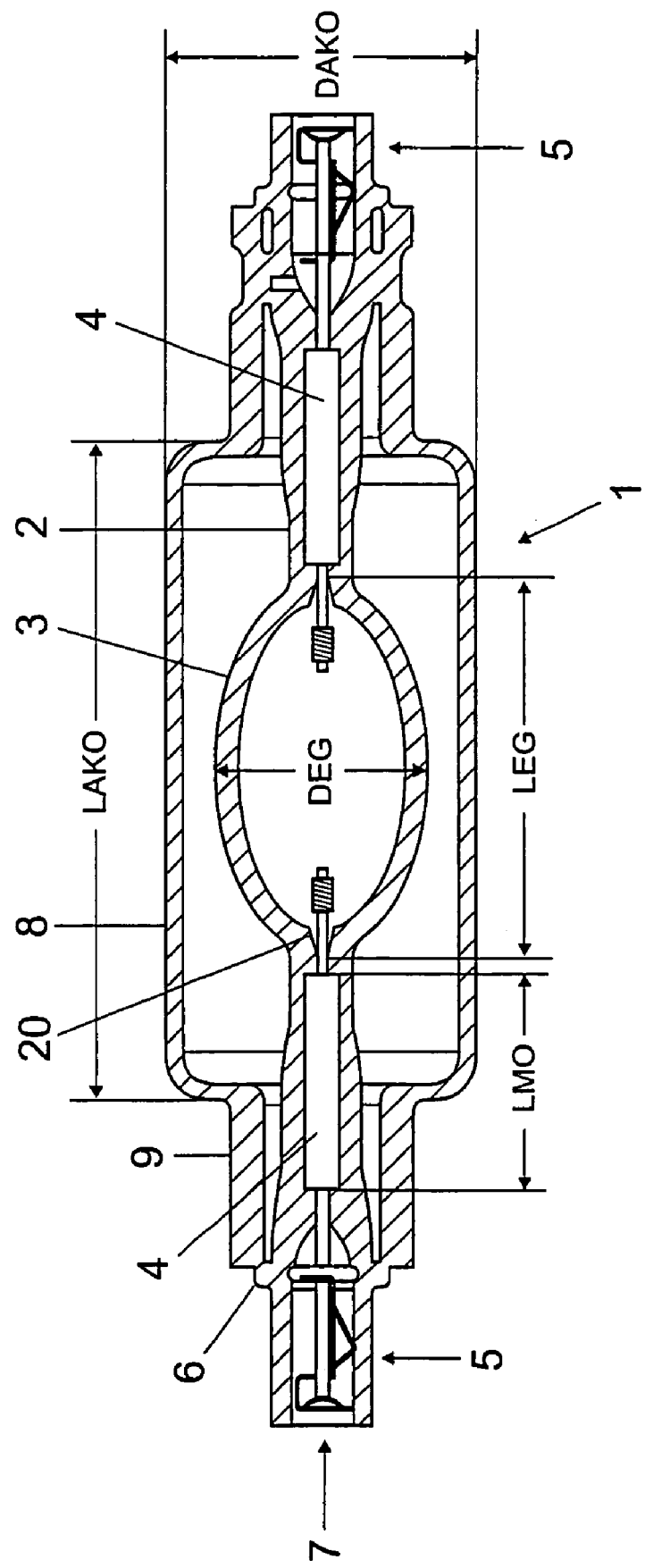
FIG. 3 shows a further exemplary embodiment of a metal halide lamp.

Finally, FIG. 3 shows a metal halide lamp, in the case of which the discharge vessel 3 is essentially in the form of an ellipsoid, but has a wedge-shaped extension 20 at the end. Here too, LEG is intended to mean the total inner length of the discharge vessel.

What is claimed is:

1. An electric lamp comprising an outer bulb enclosing an elongate inner bulb, the inner bulb being sealed in a vacuum-tight manner, defines a longitudinal axis and an inner volume with an axial inner length LEG, the inner bulb contains a luminous means and is sealed at two mutually opposing ends by a first sealing part and a second sealing part, the outer bulb having a total length LAKO and having a first neck part and a second neck part, each respective neck part being turned over the inner bulb, and the first and second neck parts being respectively fixed to the first and second sealing parts, the first and second sealing parts containing foils, wherein the ratio between the total length LAKO and the inner length LEG is between 1.3 and 4.

2. The lamp as claimed in claim 1, wherein the inner bulb has a maximum diameter DEG perpendicular to the axis, and the outer bulb has a maximum diameter DAKO perpendicular to the axis, the ratio DAKO/DEG being between 1.1 and 2.5.

3. The lamp as claimed in claim 1, wherein the length of the outer bulb LAKO (in mm) is matched to the rated power P (in W) of the lamp, with the result that the ratio P/LAKO is between 1.8 and 3.5 W/mm.

4. The lamp as claimed in claim, wherein the length of the two foils overall, LMO, is matched to the length of the outer bulb LAKO, with the result that the ratio LMO/LAKO is between 0.4 and 1.0.

5. The lamp as claimed in claim 1, wherein the first and second sealing parts are in the form of fuse seals having respective diameters perpendicular to the axis, the respective diameters of the first and second sealing parts increasing in size, axially from the inside outwards.

6. The lamp as claimed in claim 5, wherein the respective diameter of at least one of the seal parts, at the level of that end of the foil which is remote from the discharge makes up between 120% and 160% of the diameter of the at least one of the seal parts in the vicinity of the inner volume.

7. The electric lamp in claim 1, wherein the ratio between the total length LAKO and the inner length LEG is between 1.5 and 3.

8. The lamp as claimed in claim 2, wherein the ratio DAKO/DEG is between 1.2 and 2.0.

9. The lamp as claimed in claim 4, wherein the ratio LMO/LAKO is between 0.55 and 0.9.

* * * * *